United States Patent [19]

Swiderski

[11] Patent Number: 4,709,803

[45] Date of Patent: Dec. 1, 1987

[54] PREFORM TRANSFER MECHANISM

[75] Inventor: Kevin J. Swiderski, Alto, Mich.

[73] Assignee: B & G Machinery Company, Grand Rapids, Mich.

[21] Appl. No.: 828,970

[22] Filed: Feb. 12, 1986

[51] Int. Cl.$^4$ ............................................. B65G 47/90
[52] U.S. Cl. .................................. 198/468.2; 198/600;
   198/773; 294/106; 294/116; 414/753; 425/534
[58] Field of Search ................. 198/773, 468.2, 468.3,
   198/346, 600, 605, 803.9, 345; 425/534;
   414/753; 294/115, 106, 116

[56] References Cited

U.S. PATENT DOCUMENTS

| | | | |
|---|---|---|---|
| 3,225,382 | 12/1965 | Hagen | 425/531 |
| 3,545,804 | 12/1970 | Richner | 294/116 |
| 3,792,946 | 2/1974 | Zavasnik | 425/242 |
| 3,797,983 | 3/1974 | Merz | 425/242 B |
| 3,819,314 | 6/1974 | Marcus | 425/249 |
| 3,850,562 | 11/1974 | Takeuchi et al. | 425/242 B |
| 3,954,373 | 5/1976 | Rolniczak et al. | 425/387 B |
| 3,982,635 | 9/1976 | Chin et al. | 425/387 B X |
| 3,982,872 | 9/1976 | Kauffman et al. | 425/397 |
| 4,011,039 | 3/1977 | Oas et al. | 425/397 |
| 4,120,634 | 10/1978 | Michel et al. | 425/525 |
| 4,148,400 | 4/1979 | Cross | 198/345 |
| 4,212,841 | 7/1980 | Michel | 425/534 X |
| 4,233,021 | 11/1980 | Spurr | 425/525 |
| 4,251,203 | 2/1981 | Oas | 425/526 |
| 4,304,543 | 12/1981 | Rolniczak et al. | 425/532 |
| 4,310,282 | 1/1982 | Spurr et al. | 425/533 X |
| 4,313,720 | 2/1982 | Spurr | 425/526 |
| 4,317,793 | 3/1982 | Hubert et al. | 425/525 X |
| 4,343,590 | 8/1982 | D'Aloisio | 294/106 X |
| 4,382,760 | 5/1983 | Wiatt et al. | 425/139 |
| 4,405,556 | 9/1983 | Valyi | 425/523 X |

Primary Examiner—Joseph E. Valenza
Assistant Examiner—Jonathan D. Holmes
Attorney, Agent, or Firm—Price, Heneveld, Cooper, DeWitt & Litton

[57] ABSTRACT

A preform transfer mechanism for transferring preforms from an oven to a mold station includes a support frame, a slide block mounted on the support frame and an elongated transfer bar fixed to the slide block. At least two sets of jaw assemblies are positioned on the transfer bar. A jaw actuating rod engages the jaw assemblies to open and close them. An overtravel plunger carried by the rod permits independent closing of each jaw assembly to accommodate different diameter preforms. A set of preform locators or baskets are mounted on the support frame for receipt of heated preforms from the oven.

20 Claims, 7 Drawing Figures

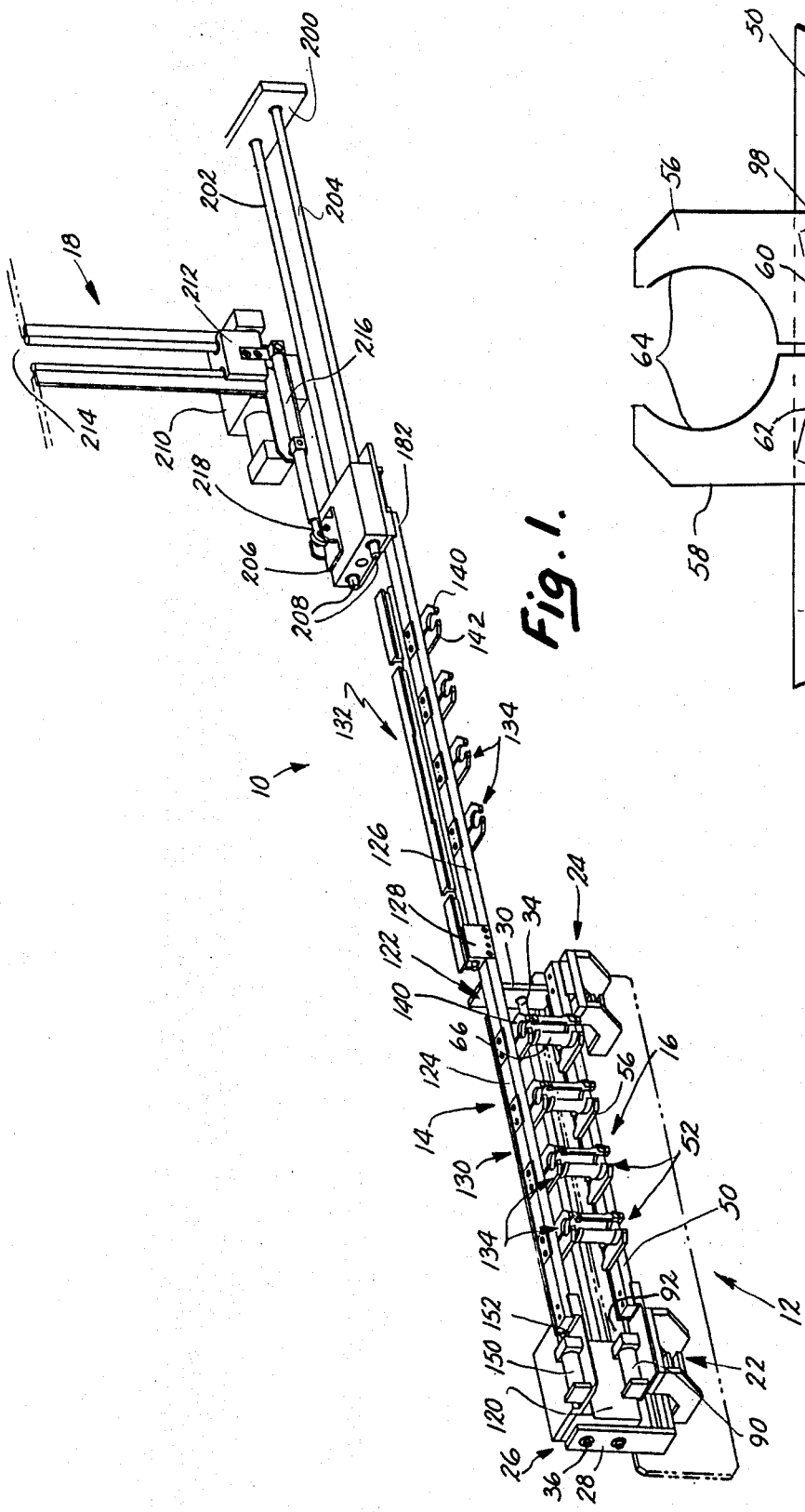
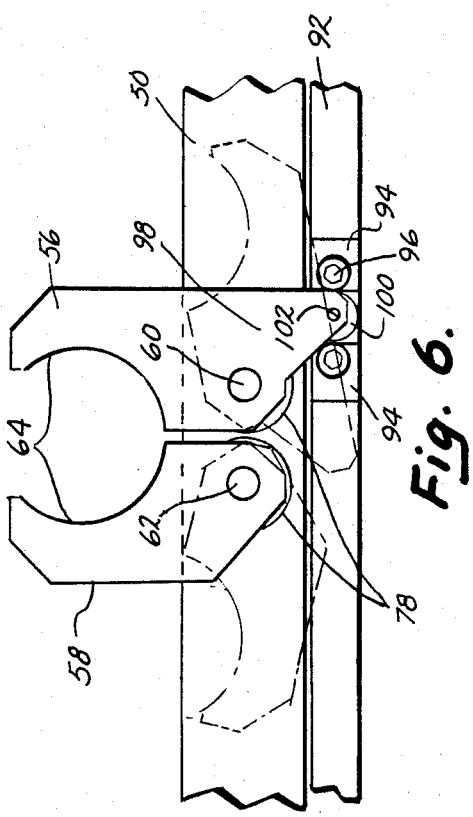

PREFORM TRANSFER MECHANISM

BACKGROUND OF THE INVENTION

The present invention relates to blow molding equipment and more particularly to apparatus for transferring preforms to a blow molding machine.

Various forms of molding devices have been developed for the formation of plastic bottles. In one approach, polyethylene terethalate preforms or parisons are first injection molded. The preforms may have a threaded neck and a cap locator or flange. Prior to blowing, the preforms are reheated to the blowing temperature of the plastic and then transferred from an oven to the blow station of a blow molding machine. The blow station includes a vertically split blow mold defining a plurality of cavities and a blow head assembly. Once the preforms are positioned within the two-piece mold, the mold is closed. The blow head delivers high pressure air to the preforms to blow mold the bottles. After molding, the mold is opened and the formed bottles are ejected from the machine.

Many different types of parison or preform transfer mechanisms have been developed. U.S. Pat. No. 4,011,039 entitled "PARISON TRANSFER DEVICE" issued on March 8, 1977, to Oas et al discloses a transfer device for moving parisons or preforms from a heating oven to a mold station. The device includes a carriage having a pair of picker assemblies for grasping and removing separate parisons from the oven. An example of another parison transfer device may be found in U.S. Pat. No. 4,313,720 entitled "PARISON TRANSFER MEANS" and issued on Feb. 2, 1982, to Spurr.

In a still further approach, a transfer or shuttle mechanism includes a plurality of jaw sets arranged side by side on a frame structure. Air cylinders open and close the jaws. Another air cylinder shifts the frame relative to a blow mold station. This basic structure is illustrated in U.S. Pat. No. 4,310,282 entitled "DELAY STRETCH AND BLOW MACHINE SYSTEM" and issued on Jan. 12, 1982, to Spurr et al.

Many of the prior preform or parison transfer mechanisms have been fairly complicated. The complexity has reduced reliability and placed limitations on production rates. In addition, problems have been experienced with proper handling of misformed preforms. Existing devices are unable to handle properly a set of preforms when one or more are of differing diameter. A need, therefore, exists for a preform transfer mechanism which will efficiently and effectively locate and receive preforms from an oven, transfer a set of preforms to a blow mold station and remove the formed product from the station at the completion of the molding operation.

SUMMARY OF THE INVENTION

In accordance with the present invention, the aforementioned problems are substantially eliminated and the needs are fulfilled. Essentially, the preform transfer mechanism in accordance with the present invention includes a slide block or carriage which may be reciprocated towards and away from a blow mold station. The carriage supports a plurality of jaw assemblies. Preform receiving and locating means are provided to receive the preforms from an oven or the like and position them properly for engagement by jaws of the transfer mechanism. Preform size or diameter compensating means incorporated into the jaw actuating structure permit each jaw of a set to act independently within defined limits. The compensating structure permits preforms of different diameter to be properly supported and engaged by the jaw assemblies.

The preform or parison transfer mechanism in accordance with the present invention is of substantially reduced complexity from many of the transfer devices heretofore proposed. The transfer device is efficient and reliable in operation. The device may be easily added to existing blow mold machines.

BRIEF DESCRIPTION OF THE DRAWINGS

FIG. 1 is a perspective view of a preform transfer mechanism in accordance with the present invention;

FIG. 6 is a fragmentary, top plan view showing a portion of the locator mechanism and locator actuator structure.

DETAILED DESCRIPTION OF THE PREFERRED EMBODIMENT

Figure 2:
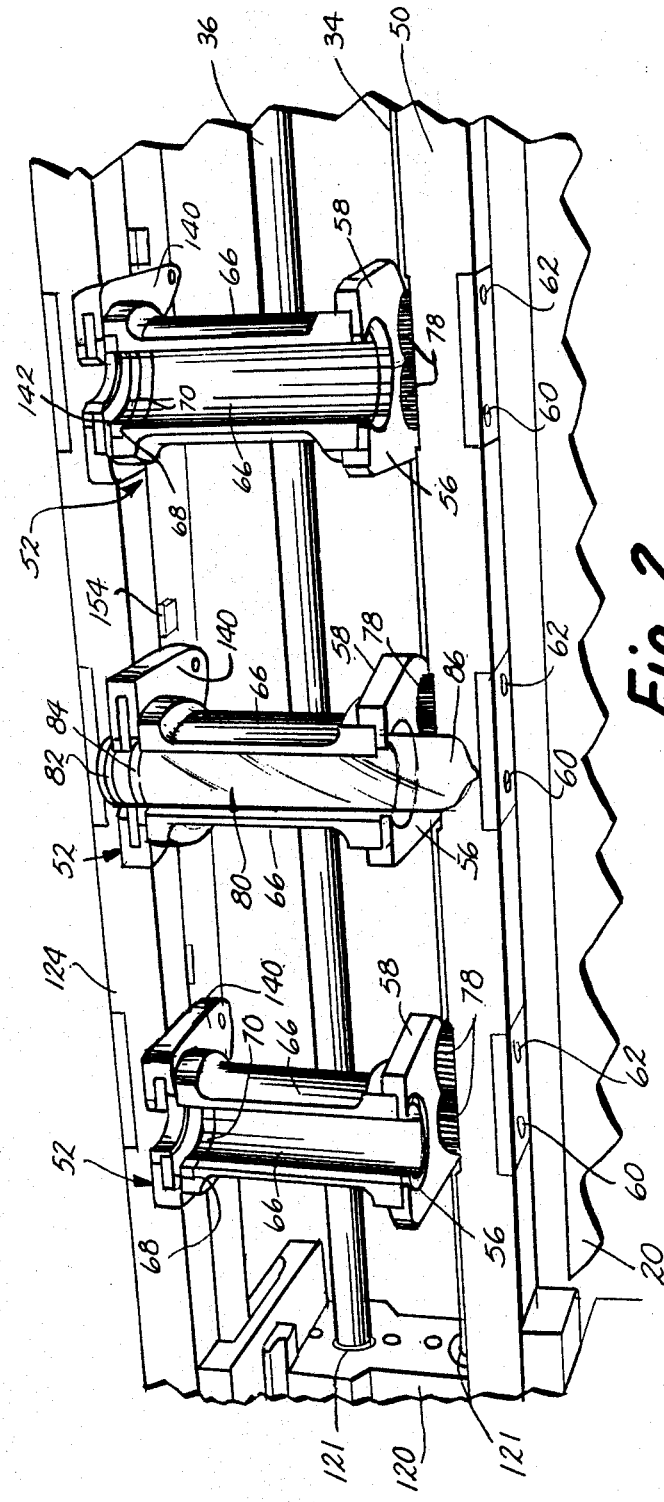
FIG. 2 is a fragmentary, front elevational view showing the preform locator means incorporated in the present invention.

A preferred embodiment of a preform transfer mechanism in accordance with the present invention is illustrated in FIG. 1 and generally designated 10. Device 10 includes a main support frame 12, a carriage and transfer subassembly 14, a locator or basket subassembly 16 and a drive 18.

Device 10 is adapted to be mounted on a blow molding machine having a two-piece, vertically split mold within which generally tubular preforms are blown into plastic bottles. Frame 12 includes a main support plate or weldment 20, support plates or brackets 22, 24 and a carriage guide structure 26. Structure 26 includes end plates 28, 30 and a base 32 supported by frame 12. Extending between end plates 28, 30 are elongated, parallel guide rods 34, 36. Rods 34, 36, as explained in more detail below, slidably support the carriage and transfer subassembly 14.

LOCATOR OR BASKET SUBASSEMBLY

As seen in FIGS. 1, 2 and 6, the locator or basket subassembly 16 includes a support bar 50. Bar 50 extends between support brackets 22, 24 in spaced, parallel relationship to guide rods 34, 36. Mounted on bar 50 are a plurality of basket or locator sets 52. Baskets 52 are adapted to receive reheated preforms from a preform oven (not shown). Baskets 52 locate or position the preforms for engagement by the carriage and transfer subassembly and subsequent positioning in a blow mold (not shown).

Figure 3:
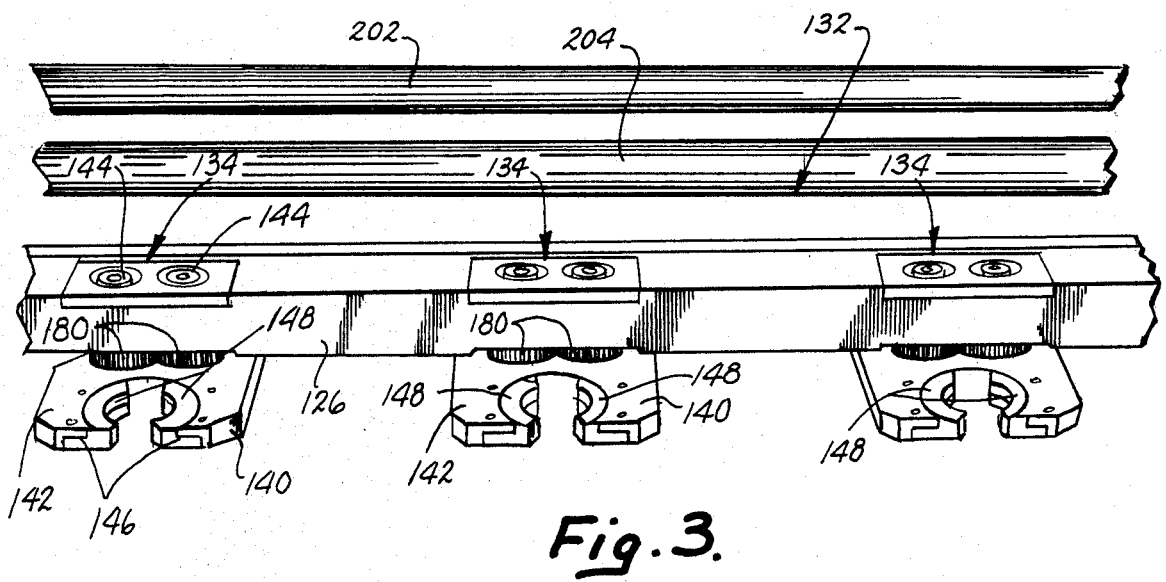
FIG. 3 is a fragmentary, perspective view showing a plurality of jaw assemblies incorporated in the present invention.

As seen in FIGS. 2 and 6, each basket subassembly 52 includes a pair of pivotal arms or clamps 56, 58. Arms 56, 58 are pivoted to support bar 50 by pivot pins 60, 62, respectively. Each arm 56, 58 defines a generally semicircular face 64. Mounted on arms 56, 58 are elongated, generally semicylindrical baskets or tubes 66. Tubes 66 extend vertically from support bar 50. Each tube 66 includes a recessed area 68 for receipt of an insulating insert 70. As best seen in FIGS. 2 and 3, gears 78 are secured to undersurfaces 72, 74 of each arm 56, 58, respectively. Gears 78 intermesh. As a result, rotation of arm 56 about pin 60 causes coordinated rotation of arm 58 about pin 62.

As shown in FIG. 6, the arms and hence the baskets 66 may be pivoted between an open position illustrated in phantom and a closed position. When in the closed position, baskets 66 receive and support an elongated tubular preform 80. Preform 80 includes a threaded neck 82, a cap or locator flange 84 and an elongated tubular portion 86. As seen in FIG. 2, flange 84 rests on insert 70. The locator baskets are initially opened, the preforms are presented at the baskets which are then closed to support the preforms.

As seen in FIGS. 1 and 6, a basket actuator mechanism is included to open and close each of the basket subassemblies 52. In the form illustrated, the actuator mechanism includes a pneumatic piston cylinder 90 and an actuating rod 92. Rod 92 at spaced points thereon supports a pair of stops 94. Stops 94 define a slot 96. Arm 56 of each basket set 52 includes an extension 98. Secured to extension 98 is a roller 100 which rotates about an axle 102. Roller 100 is received within slot 96. As should be apparent, shifting of actuator rod 92 to the left from the position shown in FIG. 6 pivots arm 56 about pin 60 to an open position. Through the intermeshing of gears 78, arm 58 is shifted to its open position. Only a single actuator rod is needed to open and close the arms which support the baskets.

CARRIAGE AND TRANSFER SUBASSEMBLY

Carriage and transfer subassembly 14 includes a carriage or slide block 120. Block 120 defines a pair of elongated throughbores 121 which encircle guide rods 34, 36. Secured to the top of carriage 120 is an elongated transfer bar or rod 122. Transfer bar or rod 122 includes a first or loading portion 124 and an ejection portion 126. Portions 124, 126 may be separate members joined by a connector 128. Supported on portion 124 is a first set 130 of jaws. Supported on portion 126 is a second set 132 of jaws. Each set 130, 132 includes a plurality of jaw subassemblies, each generally designated 134.

Figure 5:
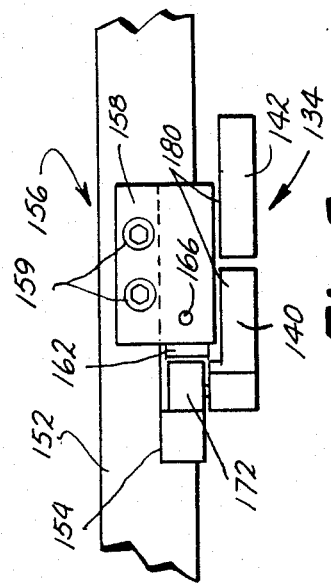
FIG. 5 is a side elevational view of the structure of FIG. 4.
Figure 4:
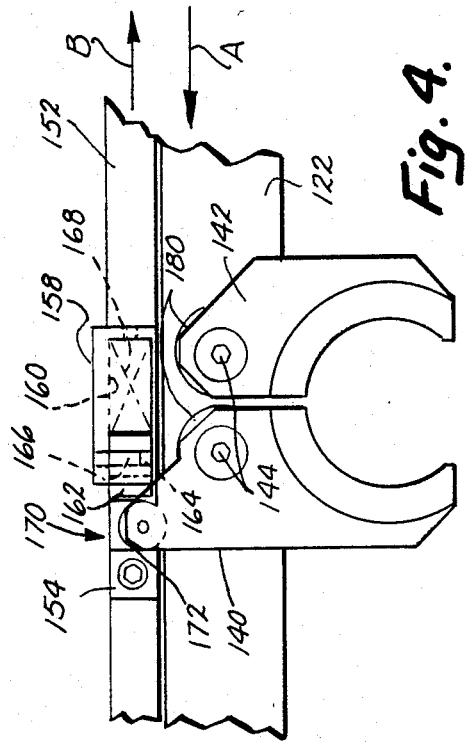
FIG. 4 is a fragmentary, bottom plan view of a jaw assembly and a portion of the actuating mechanism.

As best seen in FIGS. 3, 4 and 5, each jaw subassembly 134 includes a first arm or clamp 140 and a second arm or clamp 142. Clamps 140, 142 are pivoted to transfer bar 122 by pins 144. Arms 140, 142 define recessed, opposed faces 146. Faces 146 are adapted to receive inserts 148 (FIG. 3). Inserts 148 determine the closed diameter of each jaw subassembly 134. Different size inserts may be supported on the arms 140, 142 in order to accommodate a wide variety of preforms.

Jaw subassemblies 134 of the first set 130 are actuated by a pneumatic piston cylinder 150 supported on carriage 120. Piston cylinder 150 is connected to an elongated actuator rod 152. Rod 152 at spaced points therealong supports a plurality of stops 154 and overtravel or size compensating means 156. Means 156 includes a housing 158 secured to rod 152 by suitable fasteners 159. Housing 158 defines a chamber 160. Extending into chamber 160 and towards stop 154 is a plunger or piston 162. Piston 162 includes a transverse slot 164 (FIG. 4). A pin 166 extends through housing 158 and into the transverse slot 164. The pin and slot arrangement limits the range of reciprocating movement of plunger 162. Plunger 162 is resiliently biased towards stop 154 by a coil spring 168 disposed within chamber 160. Plunger 162 and stop 154 define a slot 170. Rotatably mounted on arm 140 of each jaw subassembly 134 is a roller 172. Roller 172 is positioned within slot 170 and engages stop 154 and plunger 162. All of the jaw subassemblies 134 of set 130 are connected to the actuating rod 152 by the stops and compensating means.

Each arm 140, 142 of each jaw subassembly 134 has a gear 180 secured thereto (FIGS. 3 and 4). Gears 180 are coaxial with pins 144. As a result of the intermeshing of gears 180, rotation of arm 140 causes complementary rotation of arm 142. Only one arm need be pivoted or rotated to open and close each jaw subassembly.

As should be apparent from FIG. 4, shifting of actuator rod 152 in the direction of arrow A will close the jaws about a preform. Shifting rod 152 in the direction of arrow B will open the jaws. The length of travel of rod 152 is initially set to position the jaws in the fully closed position, as illustrated in FIG. 4. Should the diameter of the preform engaged by a particular jaw set 134 be greater than the expected diameter, jaws 140, 142 would close about the preform prior to completion of the preset travel of actuator rod 152. Rod 152 may continue to move in the direction of arrow A with plunger 162 moving into housing 158 against the bias of spring 168. This overtravel or preform size compensating structure insures that malformed or out of diameter preforms are readily accommodated by the transfer mechanism. If the compensating structure were not included, all jaws of a set would close to the diameter of the largest preform encountered in any of the sets. The smaller diameter preforms would then be only loosely retained, if at all. The compensating structure permits each jaw set to in effect close independently about its individual preform.

An actuating structure identical to that illustrated in FIGS. 1, 4 and 5 for the jaw assemblies of set 130 is employed to actuate each jaw subassembly 134 of set 132. The separate piston cylinder actuator may be supported at an end 182 of transfer rod ejection portion 126.

DRIVE MECHANISM

As seen in FIG. 1, drive mechanism 18 includes a frame 200 from which a pair of spaced, parallel, elongated guide rods 202, 204 extend. A drive block 206 defines throughbores 208 which receive rods 202, 204. End 182 of transfer rod ejection portion 126 is secured to block 206. Reciprocation of block 206 on rods 202, 204, therefore, reciprocates bar 122. Any suitable device may be provided to reciprocate block 206 on the guide rods. In the form illustrated in FIG. 1, a hydraulic motor 210 reciprocates a slide block 212 vertically within the slot 214 through suitable links. Pivoted to slide block 212 is a drive link 216. Link 216 is pivoted at an end 218 to block 206. Vertical movement of block 212 is converted through link 216 into reciprocating, longitudinal movement of block 206 on guide rods 202, 204. Other drive mechanisms, such as a piston cylinder actuator, could be employed. The slide block arrangement illustrated in FIG. 1 is presently preferred due to its reduced space requirements.

OPERATION

Figure 7:
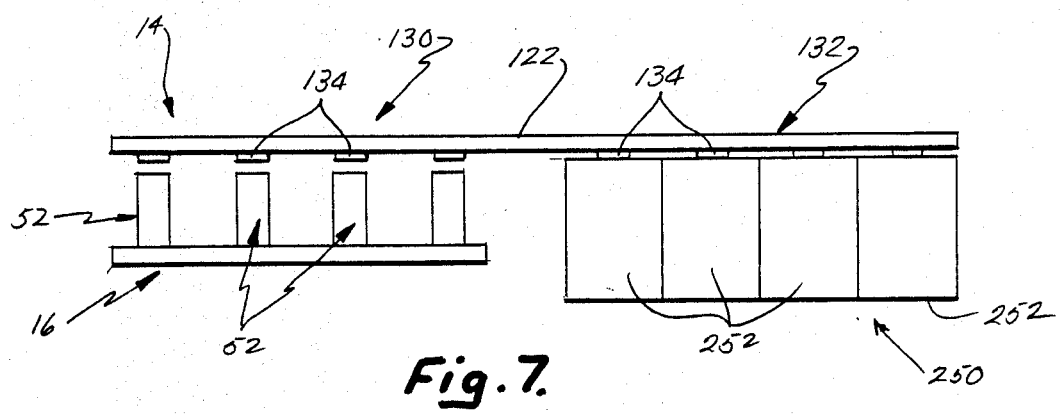
FIG. 7 is a schematic representation of the transfer mechanism and a blow mold.

FIG. 7 schematically illustrates a mold generally designated 250 having four mold cavities 252. As schematically illustrated, set 130 of jaws 134 is spaced on transfer bar 122 from set 132 a distance so that each jaw 134 of set 130 is positioned at a locator subassembly 52 while each jaw 134 of set 132 is positioned at a mold cavity 252.

At the start of a transfer cycle, bar 122 is reciprocated so that jaws 134 of set 130 are positioned at the mold cavities 252. Set 132 is shifted to the right of mold 250 to the ejection position. Baskets 66 of each basket subassembly 52 are in the open position. Preforms from an oven (not shown) are positioned at the baskets which close about and support the individual preforms. Jaws 134 of each set of jaw assemblies are opened through their respective actuators. Bar 122 is then shifted to the left to the position shown in FIG. 7. Jaws 134 of set 130 then close to engage and support the preforms. The basket subassemblies are opened. Transfer rod 122 is then shifted to the right, as shown in FIG. 7, so that the preforms supported by jaw set 130 are now positioned at the cavities 252 of mold 250. Mold 250 is closed about the preforms in a conventional fashion. The transfer bar may remain in this position during the molding operation. If the preforms have cap or location rings, the jaws may be opened and the preforms will rest on top of the mold. While in this position, another set of preforms is being deposited in the baskets 52.

Rod 122 is then shifted to the left so that jaws 134 of set 130 may receive a new set of preforms. Jaws 134 of set 132 are then positioned at the mold. These jaws close about the necks of the formed bottles. Mold 250 is opened and the cycle is repeated. Jaws 134 of set 132 move the formed bottles from between the mold halves to an ejection area while jaws 134 of set 130 present a new set of preforms at the blow mold station.

The preform or parison transfer mechanism in accordance with the present invention is adapted for easy retrofit to existing blow molding machines. The transfer mechanism eliminates the reach and take devices, picker assemblies, eject mechanism and pallet mechanisms which have heretofore been employed. The jaw assemblies readily accommodate varying sizes of preforms through the use of inserts and the size compensating mechanism. The basket subassemblies in a split clamshell fashion readily receive, support and locate or position preforms for subsequent transfer to the blow mold machine. Increased production rates are readily achieved.

In view of the foregoing description, those of ordinary skill in the art may envision various modifications to the subject invention which would not depart from the inventive concepts disclosed. It is, therefore, expressly intended that the above description should be considered as only that of the preferred embodiment. The true spirit and scope of the present invention may be determined by reference to the appended claims.

The embodiments of the invention in which an exclusive property or privilege is claimed are defined as follows.

1. A preform transfer mechanism for receiving preforms, transferring the preforms to a blow mold station and for removing the formed product from the mold station, said mechanism comprising:
   a support frame including a guide rod;
   a slide block slidably mounted on said guide rod of said support frame;
   an elongated transfer bar fixed to said slide block for reciprocating movement therewith;
   a plurality of jaw assemblies on said elongated transfer bar for gripping the preforms;
   jaw actuating means connected to said jaw assemblies for opening and closing said jaw assemblies;
   preform receiving means on said support frame for receiving preforms from an oven or the like and holding the preforms in a fixed position relative to said slide block until such are engaged by said jaw assemblies; and
   drive means operatively connected to said transfer bar for reciprocating said slide block and said bar on said support frame, said preform receiving means comprising:
   an elongated support bar fixedly mounted on said support frame in spaced, parallel relationship to said guide rod;
   a plurality of basket sets on said support bar, each basket set including a pair of curved, partially cylindrical basket halves and arm means for pivotally supporting said halves to said support bar; and
   basket actuating means operatively connected to said arm means for moving said basket halves from an open position to a closed position at which the basket halves encircle and support a preform.

2. A preform transfer mechanism as defined by claim 1 wherein said arm means comprises:
   a first arm pivoted to said support bar and carrying one of said basket halves;
   a second arm pivoted to said support bar and carrying the other of said basket halves;
   a first gear secured to said first arm and rotatable with said first arm; and
   a second gear secured to said second arm and meshing with said first gear, so that rotation of said first arm results in rotation of said second arm.

3. A preform transfer mechanism as defined by claim 2 wherein said basket actuating means comprises:
   an actuating rod engaging said first arm; and
   means for reciprocating said actuating rod.

4. A preform transfer mechanism as defined by claim 3 wherein said actuating means further comprises:
   said first arm including an extension, a roller secured to said extension and engaged by said actuating rod, said rod defining a slot for receipt of said roller.

5. A preform transfer mechanism as defined by claim 4 wherein said jaw assemblies each include:
   a first jaw member pivoted to said transfer bar;
   a second jar member pivoted to said transfer bar; and
   gear means on said jaw members for opening and closing said jaw members together upon movement of one of said jaw members.

6. A preform transfer mechanism as defined by claim 5 wherein said jaw actuating means comprises:
   an elongated jaw actuating rod; and
   a plurality of connecting means on said jaw actuating rod for connecting one of said jaw members of each of said jaw assemblies to said jaw actuating rod so that shifting of said jaw actuating rod pivots said one of said jaw members to open and close said jaw assemblies.

7. A preform transfer mechanism as defined by claim 6 wherein said connecting means further includes preform size compensating means for allowing each jaw assembly to accommodate a different diameter preform.

8. A preform transfer mechanism as defined by claim 7 wherein said size compensating means comprises:
   a stop on said jaw actuating rod; and
   plunger means on said jaw actuating rod spaced from said stop and for defining a variable width slot therewith, said slot receiving said one of said jaw members.

9. A preform transfer mechanism as defined by claim 8 wherein each of said jaw assemblies further includes a roller carried by said one of said jaw members and disposed in one of said variable width slots.

10. A preform transfer mechanism as defined by claim 9 wherein said plunger means comprises:
a housing;
a plunger extending from said housing towards said stop; and
a spring within said housing and engaging said plunger.

11. A preform transfer mechanism as defined by claim 1 wherein said jaw assemblies each include:
a first jaw member pivoted to said transfer bar;
a second jaw member pivoted to said transfer bar; and
gear means on said jaw members for opening and closing said jaw members together upon movement of one of said jaw members.

12. A preform transfer mechanism as defined by claim 11 wherein said jaw actuating means comprises:
an elongated jaw actuating rod; and
a plurality of connecting means on said jaw actuating rod for connecting one of said jaw members of each of said jaw assemblies to said jaw actuating rod so that shifting of said jaw actuating rod pivots said one of said jaw members to open and close said jaw assemblies.

13. A preform transfer mechanism as defined by claim 12 wherein said connecting means further includes preform size compensating means for allowing each jaw assembly to accommodate a different diameter preform.

14. A preform transfer mechanism as defined by claim 13 wherein said size compensating means comprises:
a stop on said jaw actuating rod; and
plunger means on said jaw actuating rod spaced from said stop for defining a variable width slot therewith, said slot receiving said one of said jaw members.

15. A preform transfer mechanism as defined by claim 14 wherein each of said jaw assemblies further includes a roller carried by said one of said jaw members and disposed in one of said variable width slots.

16. A preform transfer mechanism as defined by claim 15 wherein said plunger means comprises:
a housing;
a plunger extending from said housing towards said stop; and
a spring within said housing and engaging said plunger.

17. A preform gripping assembly for engaging and supporting a generally cylindrical preform, said assembly comprising:
a jaw support;
a pair of jaws pivoted to said support for closing and opening movement towards and away from each other;
an actuating rod engaging one of said jaws;
actuating means connected to said rod for reciprocating said rod to move said one of said jaws towards and away from the other of said jaws, said one of said jaws including a roller secured thereto; and
preform size compensating means carried by said rod and engaging said one of said jaws for permitting said jaw to close properly around different size preforms, said size compensating means and said actuating rod defining a slot for receiving said roller and wherein said size compensating means comprises:
a housing carried by said actuating rod;
a plunger slidably received in and extending from said housing; and
resilient means within said housing and engaging said plunger, said plunger engaging said roller.

18. A preform gripping assembly as defined by claim 17 wherein said resilient means is a coil spring.

19. A preform gripping assembly as defined by claim 17 further including gear means on said jaws for moving said jaws towards and away from each other upon pivotal movement of said one of said jaws.

20. A preform gripping assembly as defined by claim 18 further including gear means on said jaws for moving said jaws towards and away from each other upon pivotal movement of said one of said jaws.

* * * * *